(No Model.)
E. O. BARTLETT.
PIGMENT FURNACE.
No. 515,039. Patented Feb. 20, 1894.
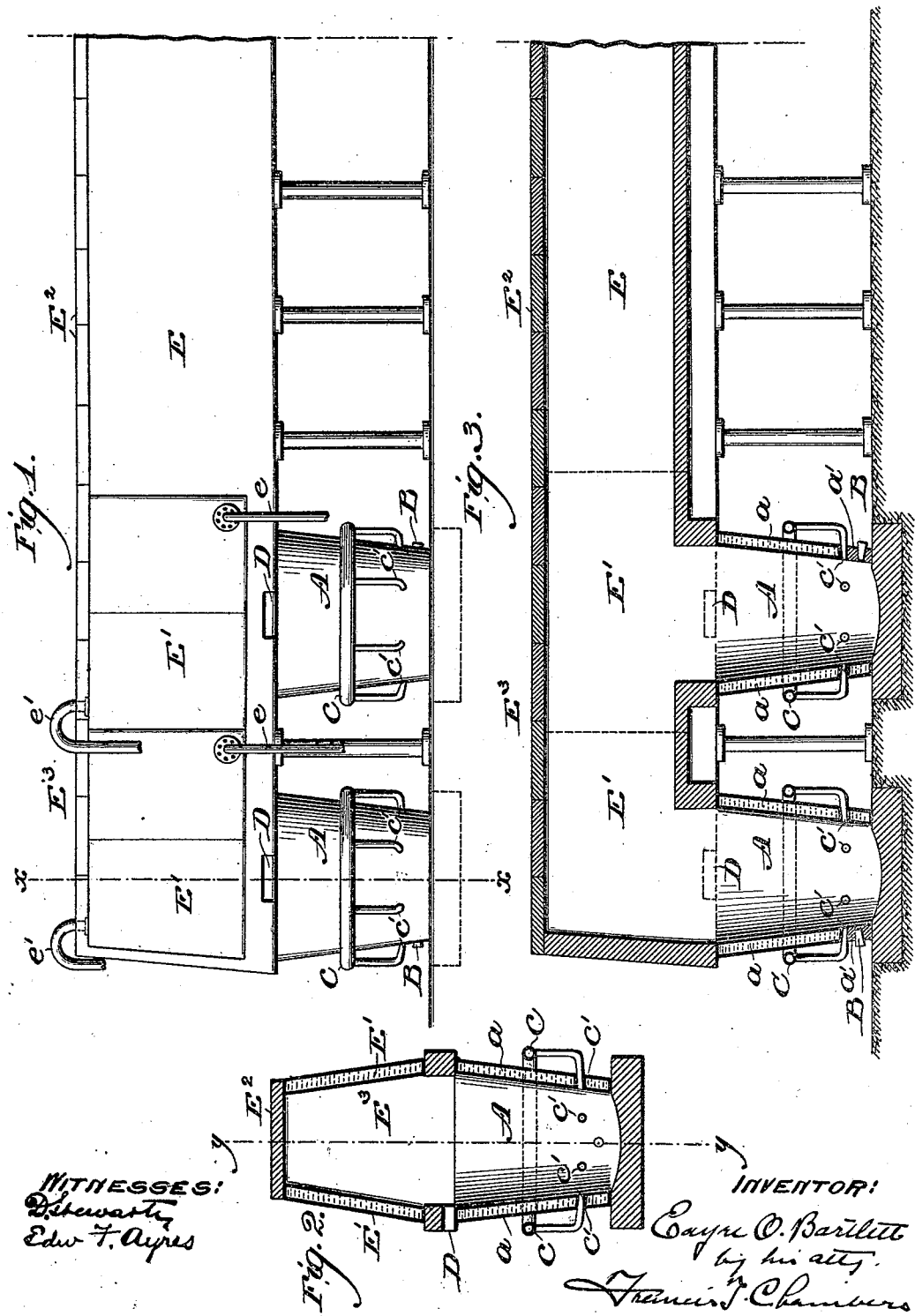
WITNESSES:
D. Stewart
Edw. T. Ayres
INVENTOR:
Eayre O. Bartlett
by his atty.
Francis T. Chambers

UNITED STATES PATENT OFFICE.

EAYRE O. BARTLETT, OF JOPLIN, MISSOURI.

PIGMENT-FURNACE.

SPECIFICATION forming part of Letters Patent No. 515,039, dated February 20, 1894.

Application filed April 4, 1893. Serial No. 469,006. (No model.)

*To all whom it may concern:*

Be it known that I, EAYRE O. BARTLETT, a citizen of the United States, and a resident of Joplin, in the county of Jasper, in the State of Missouri, have invented a certain new and useful Improvement in Pigment-Furnaces, of which the following is a true and exact description, reference being had to the accompanying drawings, which form a part of this specification.

My invention relates to the construction of furnaces and connecting mechanism adapted for the production of metallic fumes to be used as a pigment, and has especial reference to the treatment of such ores or metals as give off fumes which are basic in their chemical action. It has been found desirable for the production of a good pigment to carry the products of combustion together with the fume arising with such products from the furnace through a flue made up of refractory material and kept at a high temperature by the action of the furnace gases, such a flue having the effect of purifying the fume, which, after having been exposed to this purifying influence, is carried through a cooling system and finally separated from the gaseous products of combustion by screening. To insure the proper action of the purifying flue it is essential that it should be maintained at a very high temperature, and a great deal of trouble has been experienced owing to the fact that the portion of the flue in immediate juxtaposition to the furnaces is heated to so high a temperature and brought into such intimate contact with the fume arising from the furnaces that the basic fume, such as the fume from lead or lead ores, acts powerfully upon the acid fire brick of which the walls of the flue are composed, the lead combining with the silica and alumina of the brick and forming a liquid vitreous mass which would tend to choke the flue and also cause cracking and falling down of the flue; large losses of lead were also occasioned by the fact that this vitreous mass would to a certain extent run into the furnaces, and also by charging the material partly composed of this compound of lead, silica, and alumina, into the furnace after cleaning the flue. This material naturally produced a silicious slag in the furnace with the result of, either a considerable loss in lead, or of a loss owing to the use of expensive fluxes to avoid an absolute loss in lead. To avoid the above mentioned causes of loss I have tried the use of basic brick for lining the flue which, however, is undesirable owing to its increased cost; and when using acid brick I have found it necessary to run the furnaces for a considerable portion of the time with a low blast, with the result of considerable lead losses in the slag and a generally unsatisfactory working of the furnaces and flue. Now I have discovered that the drawbacks to the process as previously practiced can be overcome by constructing that portion of the flue in immediate juxtaposition and communication with the furnaces with all or a portion of its walls made up of iron or steel water jackets, and constructing the remaining portion of the flue farthest removed from the furnaces with walls of refractory material such as fire-brick as heretofore. I find that it is not essential that the portion of the flue in immediate connection with the furnaces should be entirely made up of water jackets, all that is necessary being that a sufficient portion of the flue should be water-jacketed to prevent this end of it from attaining so high a temperature as to cause active combination between the basic fume and acid brick. By constructing the flue and combining it with the furnace or furnaces in the way indicated I am enabled to run my furnaces uniformly and at a very high temperature without undue destructive action upon the material of the flue, and, at the same time, to maintain that portion of it composed of refractory material at the necessary temperature to effect the purification of the fume.

Reference is now had to the drawings which illustrate my invention and in which—

Figure 1 is a side elevation showing the combination of the purifying flue with the furnaces; Fig. 2 a cross section on the line $x—x$ of Fig. 1, and Fig. 3 a longitudinal section on the line $y—y$ of Fig. 2.

A A indicate the pigment furnaces, which, as shown, are of the well known low cupola type having their sides $a\,a$ water jacketed except at the base where the tap hole B is formed in a masonry portion indicated at $a'$.

C indicates the blast pipe from which extend the tuyeres $C'$.

D, indicates the feed opening of the furnace.

E, indicates the purifying flue into which the gases and fume from the furnace pass and which is made up with walls of refractory material of sufficient thickness to prevent the escape of heat.

The portion $E^3$ of the flue in immediate juxtaposition and communication with the furnace A is formed with all, or a portion of its walls made up of water jackets E' E'; these water jackets being provided with pipes $e$ through which water is fed to them and pipes $e'$ through which the water escapes. As shown, only the sides of the flue are formed of these water jackets, the base being of masonry and the top formed of heavy tile as indicated at $E^2$. This construction I have found in practice to attain the advantages previously noted. In using this construction of flue we find a great advantage owing to the fact that the flue is not choked up and that any particles of fume settling on the water jacket gradually fall off therefrom and drop back into the fire causing no loss from the presence of silicious material and no expense in handling. The material which collects between the furnaces I find to be in a comparatively loose condition so that it can be readily raked down into the furnaces without blowing them out, and I also find that the use of these water jackets does not injuriously affect the function of the flue in purifying the pigment.

I may mention also that this construction of furnace and flue has been found especially well adapted for use when the furnace is fed with powdered lead ore as described in the patent to Petraeus for process of making sublimated lead pigment, No. 492,832, granted March 7, 1893.

Having now described my invention, what I claim as new, and desire to secure by Letters Patent, is—

1. The combination with one or more pigment producing furnaces, of a refining flue leading therefrom having a portion of its length in immediate juxtaposition with the furnaces composed wholly or partly of water jackets, and a portion farther removed from the furnaces of non-conducting material.

2. The combination with one or more pigment producing furnaces of a refining flue leading therefrom having a portion of its length in immediate juxtaposition with the furnaces and situated above the same composed wholly or partly of water jackets, and a portion farther removed from the furnaces of non-conducting material.

3. The combination with one or more pigment producing furnaces of the low cupola type, of a refining flue leading therefrom having a portion of its length in immediate juxtaposition with the furnaces composed wholly or partly of water jackets, and a portion farther removed from the furnaces of non-conducting material.

EAYRE O. BARTLETT.

Witnesses:
 WALTER D. ALLEN,
 FRANCIS T. CHAMBERS.